United States Patent
Peschel et al.

(12) 
(10) Patent No.: US 12,286,712 B2
(45) Date of Patent: Apr. 29, 2025

(54) METHOD AND INSTALLATION FOR THE ELECTROLYTIC PRODUCTION OF LIQUID HYDROGEN

(71) Applicant: Linde GmbH, Pullach (DE)

(72) Inventors: Andreas Peschel, Pullach (DE); Umberto Cardella, Pullach (DE); Benjamin Hentschel, Pullach (DE)

(73) Assignee: Linde GmbH, Pullach (DE)

( * ) Notice: Subject to any disclaimer, the term of this patent is extended or adjusted under 35 U.S.C. 154(b) by 218 days.

(21) Appl. No.: 17/657,272

(22) Filed: Mar. 30, 2022

(65) Prior Publication Data

US 2022/0316076 A1  Oct. 6, 2022

(30) Foreign Application Priority Data

Mar. 30, 2021 (EP) .................................. 21020168

(51) Int. Cl.
*C25B 1/04* (2021.01)
*F25J 1/00* (2006.01)
*F25J 1/02* (2006.01)

(52) U.S. Cl.
CPC ............. *C25B 1/04* (2013.01); *F25J 1/001* (2013.01); *F25J 1/0228* (2013.01); *F25J 1/0279* (2013.01);
(Continued)

(58) Field of Classification Search
CPC ......... C25B 1/04; C25B 15/085; C25B 15/08; F25J 1/001; F25J 1/0228; F25J 1/0279; F25J 2210/06; F25J 2260/30; F25J 1/0245; F25J 1/0251; F25J 2205/86; F25J 1/0227; F25J 1/0242; F25J 2220/02; F25J 2230/22; F25J 2230/30; F25J 2240/70; F25J 2270/906; F25J 2290/62; F25J 1/0017; F25J 1/023; F23J 2215/10
See application file for complete search history.

(56) References Cited

U.S. PATENT DOCUMENTS

2007/0084718 A1\* 4/2007 Fleming .................... C25B 9/17
  204/232
2008/0022593 A1\* 1/2008 Gur ........................... C25B 1/02
  48/116
(Continued)

FOREIGN PATENT DOCUMENTS

| CN | 107779906 A | * | 3/2018 | |
| EP | 3163236 A1 | | 3/2017 | |
| EP | 4001462 A1 | * | 5/2022 | ............... C25B 1/04 |

*Primary Examiner* — Miguel A Diaz
*Assistant Examiner* — Ibrahim A. Michael Adeniji
(74) *Attorney, Agent, or Firm* — Millen, White, Zelano & Branigan; Brion P. Heaney

(57) ABSTRACT

The invention relates to a method (100) for the electrolytic production of a liquid hydrogen product (4), in which a water-containing feed is subjected to an electrolysis (E) while receiving an anode raw gas (3), rich in oxygen and containing hydrogen, and a cathode raw gas (2) which is depleted of oxygen and rich in hydrogen, wherein the cathode raw gas (2) downstream of the electrolysis (E) is subjected to a purification (R), a compression (K), and a liquefaction (L), characterized in that the cathode raw gas (2) at least partially undergoes intermediate storage (Z) downstream of the electrolysis (E) and upstream of the liquefaction (L). A corresponding installation is also proposed.

18 Claims, 1 Drawing Sheet

(52) U.S. Cl.
CPC ........ *F25J 2210/06* (2013.01); *F25J 2260/30* (2013.01)

(56) References Cited

U.S. PATENT DOCUMENTS

| | | | | |
|---|---|---|---|---|
| 2009/0115190 | A1* | 5/2009 | Devine | C25B 9/70 |
| | | | | 204/554 |
| 2014/0102885 | A1* | 4/2014 | Devine | C25B 15/02 |
| | | | | 204/267 |
| 2017/0321332 | A1* | 11/2017 | Gupta | F25J 1/0228 |
| 2019/0145012 | A1* | 5/2019 | Murayama | C25B 13/02 |
| | | | | 205/628 |
| 2021/0270522 | A1* | 9/2021 | Molter | F25J 1/0221 |
| 2022/0290309 | A1* | 9/2022 | Wehrman | F04D 17/10 |

\* cited by examiner

METHOD AND INSTALLATION FOR THE ELECTROLYTIC PRODUCTION OF LIQUID HYDROGEN

CROSS-REFERENCE TO RELATED APPLICATIONS

This application claims priority pursuant to 35 U.S.C. 119(a) to European Patent Application No. 21020168.7, filed Mar. 30, 2021, which application is incorporated herein by reference in its entirety.

FIELD OF THE INVENTION

The invention relates to a method for the electrolytic production of a liquid hydrogen product and to an installation for the execution thereof.

BACKGROUND OF THE INVENTION

Hydrogen can be obtained using various methods, e.g., by steam reformation of hydrogen-containing organic compounds such as methane, by co-electrolysis of water and carbon dioxide, or by electrolysis of water.

The last method can be based in particular upon a use of alkaline electrolysis (AEL), proton-exchange membranes (PEM), anion-exchange membranes (AEM), or solid oxide electrolyzer cells (SOEC). Optionally, various of these technologies can also be used in combination or parallel to one another in an installation.

Hydrogen can be liquefied by cooling and subsequent condensation against a suitable cooling medium such as hydrogen or helium. Before condensation, the hydrogen must be precooled in order to increase the efficiency of liquefaction. Evaporating liquid nitrogen (LIN) is typically used for precooling.

Industrial installations for the liquefaction of hydrogen are known, wherein reference is made, for example, to EP 3 163 236 A1. In this case, in order to provide a liquid hydrogen stream, a hydrogen gas stream is typically cooled to a temperature below its condensation point by means of a number of closed cooling circuits, said cooling circuits comprising a precooling circuit and main cooling circuit.

In conventional cooling circuits, nitrogen is typically used as the coolant. Here, for example, the evaporation of liquid nitrogen at approximately 78 K is utilized in order to first cool a hydrogen stream from ambient temperature to about 80 K in the context of precooling circuits. This is achieved by conducting the nitrogen stream and the hydrogen stream through a correspondingly-designed heat exchanger. The hydrogen stream cooled in this way is then guided through a purification unit designed as an adsorber unit in order to remove residual contaminants.

After this purification, an ortho-para conversion of the hydrogen is typically carried out in a converter device, which typically takes the form of one or more heat exchangers or containers filled with catalyst material.

This is generally followed, within the context of the main cooling circuit, by a further cooling down to below the critical temperature of the hydrogen (about 33 K) to a temperature level of about 20-24 K.

More recently, particular attention has been paid to decoupling energy production and product production from carbon dioxide emissions. In this context, the electrolysis of water is particularly suitable for providing hydrogen as a substitute for climate-damaging natural gas and as a base material for the chemical industry. In particular, in combination with renewable electrical energy, e.g., wind power, tidal power, wave power, hydropower, or solar power, electrolysis can provide hydrogen in a largely emission-free manner. However, it should be noted that it is precisely the regenerative energy sources mentioned that are frequently subject to strong supply fluctuations, which is why there is a need for flexibly-controllable electrolysis methods and installations.

The aim of the invention is therefore to provide an improved concept for the electrolytic production of hydrogen, and in particular for more flexible control of its energy requirements.

SUMMARY

This aim is achieved by methods and installations according to the respective independent claims, and in particular in that hydrogen is intermediately stored downstream of the electrolysis and upstream of liquefaction in order to compensate for the different dynamics of electrolysis and liquefaction. Advantageous developments are the subject matter of the dependent claims and also of the following description.

The term, "liquid hydrogen product," is used here for liquid media which are exported from the method according to the invention or from a corresponding installation. These do not have to consist exclusively of hydrogen, but do have a hydrogen content of more than 80%, 90%, 95%, or 99%—in particular, on a molar basis.

The terms, "cathode raw gas" or "raw hydrogen," are, on the other hand, used for media of the particular specified state of aggregation in which the hydrogen contents are lower than in the liquid hydrogen product. The liquid hydrogen product is formed by corresponding purification of at least a part of the raw hydrogen. Raw hydrogen contains, in particular, considerable amounts of oxygen and water as components to be removed.

In the language of the present patent application, a gas mixture is rich in one or more components when it has a proportion of more than 50%, 60%, 70%, 80%, 90%, 95%, 98%, 99%, 99.9%, or 99.99% of this one or these several components, wherein, in the case of several components, the proportion is understood to be the sum of the individual fractions.

Accordingly, a mixture is low in one or more components when it is not rich in this or these components, i.e., the proportion of these components in the total mixture is less than 50%, 40%, 30%, 20%, 10%, 5%, 2%, 1%, 0.1%, or 0.01%.

A gas or mixture enriched in one or more components denotes a gas or mixture which has a higher concentration of the one or more components in relation to a starting gas or mixture. In particular, a gas enriched in a component has a proportion of this component which is at least 1.1, 1.3, 2, 3, 10, 30, 100, 300, or 1,000 times higher than that of the corresponding starting gas.

Accordingly, a gas depleted in one component has a proportion of this component which is at most 0.001, 0.003, 0.01, 0.03, 0.1, 0.3, 0.5, or 0.9 times that of the corresponding starting gas.

When it is stated below that a portion of a gas or a mixture is used, this can either mean that a volume fraction of the gas or mixture up to 100% of the total standard volume of the original gas or mixture with the same composition as the latter is used, or that a gas or mixture is used which was formed using only certain components of the original gas or mixture. The portion of the gas or mixture can thus have the same composition as or a different composition than the original gas or mixture. In addition, the term can mean that, in a first time period, the gas or mixture is used fully or in a higher proportion, but, in a second time period, is not used or is used in a lower proportion. This results in a partial use in the sense that, on average over time, neither 100% nor 0% of the gas or mixture is used, but, rather, a proportion which lies between these extremes.

A method according to the invention for the electrolytic production of a liquid hydrogen product, in which a water-containing feed is subjected to an electrolysis while receiving an anode raw gas, rich in oxygen and containing hydrogen, and a cathode raw gas which is depleted of oxygen and rich in hydrogen, wherein the cathode raw gas downstream of the electrolysis is subjected to a purification, a compression, and a liquefaction, is characterized in that the cathode raw gas at least partially undergoes intermediate storage downstream of the electrolysis and upstream of the liquefaction. As a result, the different dynamics of electrolysis and liquefaction can be mutually reconciled, so that the method can be carried out largely continuously, even in the event of strong fluctuations in electrolysis output.

In particular, electrolysis output is more dynamically variable than liquefaction output. For example, the electrolysis output can be varied between 10% and 100% of the nominal output, wherein a variation rate of up to 10 percentage points per second can be realized. In contrast, the liquefaction output can be regulated much more slowly. Typically, this can be varied between 30% and 100% of the corresponding nominal output, wherein variation rates of at most 2 percentage points per minute can be achieved. The described lines are understood here to be throughput capacities—for example, in a dimension of mass per time unit or volume per time unit.

In particular, intermediate storage takes place at a temperature level in a range close to ambient temperature (for example, from 250 to 330 K, and in particular between 273 K and 313 K) and a pressure level in a range of 1 to 20 MPa and/or as cold gas at a temperature level in a range of 50 to 100 K, and in particular 75 K to 100 K, and a pressure level of 1 to 20 MPa, and in particular 3 to 10 MPa. Suitable materials for such an intermediate storage are, for example, steel or carbon- or glass-fiber-reinforced plastic (CRP/GFRP), e.g., Type 1-4 high-pressure gas cylinders (so-called tube bundles). The most suitable storage overall can thus be selected for the respective application. Typically, the hydrogen is generated from the electrolysis at a pressure of up to 3 MPa. For intermediate storage at pressures between 1 and 20 MPa, one or more hydrogen compressors can be provided upstream of the storage tanks, e.g., turbocompressors, displacement machines (reciprocating compressors, membrane compressors, ionic compressors), screw compressors, or electrochemical compressors. For example, it can be taken into account here that storage at the lower temperature level allows significantly smaller storage volumes with the same storage capacity, due to the higher density of the hydrogen under these conditions. By contrast, storage at the higher temperature level has the advantage that less cooling energy is lost, since a low heat input cannot be ruled out during the storage of already-precooled hydrogen, which is significantly less relevant in the case of storage at an essentially ambient temperature. Storage in the form of a metal hydride or by means of liquid organic hydrogen carriers (LOHC) may, optionally, provide volume benefits with higher investment costs.

In this case, intermediate storage can be implemented upstream and/or downstream of purification, wherein, in particular, storage at the higher temperature level is advantageous upstream of purification, while downstream of purification, storage at the lower temperature level, in particular, is advantageous. A combination of the two can also offer advantages, since, in this way, the dynamics of purification can also be taken into account or compensated for.

The purification can comprise at least one of the group consisting of a catalytic conversion of oxygen to form water, an adsorption, a distillative separation, and a scrubbing with an absorption fluid. These are particularly effective ways of removing relevant impurities from a stream consisting predominantly of hydrogen.

In advantageous developments, the electrolysis can be carried out at at least two different pressure levels, wherein the cathode raw gas of the electrolysis which is carried out at a higher pressure level undergoes at least partially intermediate storage, and the cathode raw gas of the electrolysis which is carried out at a lower pressure level does not undergo intermediate storage. By carrying out different electrolyses in parallel at different pressure levels, storage can take place without intermediate compression, while, for the subsequent liquefaction, which in such cases advantageously operates at an input pressure level which is below the lower electrolysis pressure level, only intermediately stored cathode raw gas needs to be expanded to the lower pressure level.

The electrolysis is, advantageously, operated as a function of an external energy supply, such that, with a high supply, a high electrolysis output is set, and, with a low supply, a low electrolysis output is set. In this way, the fluctuating energy supply can be used flexibly. It is goes without saying that, due to the intermediately-stored anode raw gas, the liquefaction output does not need to be reduced, or only to a lesser extent.

In some developments, the low electrolysis output and/or a low liquefaction output are maintained using hydrogen subjected to intermediate storage and/or to liquefaction. This is particularly advantageous if the external energy supply is not sufficient to run electrolysis or liquefaction at a minimum level, which corresponds, in particular, to a lower output limit. However, the use of hydrogen generated locally by the electrolysis can ensure that the electrolysis is quickly ready to run, since this does not require a "cold start," which would have significantly lower dynamics. In particular, in the event of just a short-term supply drop, electrolysis can thus be operated in such a way that it can be quickly increased again in terms of output as soon as the external energy supply again permits this.

In particular, liquefaction is maintained using the intermediately-stored hydrogen (or is carried out slowly in the load). The electrolysis can be varied more quickly in the load (for example, with load change rates of more than 1%/min, more than 0.1%/s, or more than 1%/s, in each case in relation to a maximum output of the electrolysis), while the liquefier can be varied less well or more slowly (for example, at a rate of less than 5%/min or less than 2%/min, in each case in relation to a maximum output of the liquefaction). The faster load change of electrolysis here goes in both directions:

In the case of a high supply of electricity, electrolysis can be run up rapidly, and hydrogen can be stored temporarily, wherein liquefaction is adapted less dynamically to the variable supply.

In the case of a low supply of electricity, electrolysis can be rapidly slowed down, and intermediately-stored hydrogen can be used for liquefaction, so that this can be slowed down more slowly or maintained (depending upon the storage level).

An installation according to the invention for producing a liquid hydrogen product, which accordingly benefits from the advantages explained in relation to the method, comprises an electrolysis unit with at least one electrolyzer, a purification unit which is designed to enrich with hydrogen a cathode raw gas produced in the electrolysis unit and to at least partially deplete it in other components, a liquefaction unit which is designed to liquefy a gas stream rich in hydrogen, and an intermediate storage which is arranged downstream of the electrolysis unit and upstream of the liquefaction unit and is designed to store at least a portion of the raw cathode gas produced in the electrolysis unit. Optionally, the installation can additionally (in particular, upstream of the intermediate storage) comprise one or more compressors in order to increase the density of the hydrogen.

In particular, the installation further comprises means which enable the installation to carry out a method as described above.

BRIEF DESCRIPTION OF THE DRAWINGS

Further features and advantages of the invention or advantageous developments thereof are explained in more detail below with reference to the attached drawing, wherein.

DETAILED DESCRIPTION OF THE INVENTION

As already explained at the outset, the invention relates both to a method and to an installation for the electrochemical production of a liquid hydrogen product. The schematic representation in FIG. 1 can be interpreted both as an installation and as a flowchart of a method. If, therefore, an installation component is described below, the statements will also apply analogously to a method step carried out in this installation component, and vice versa. For this reason, the reference signs are also used below to designate method steps which are carried out in corresponding installation parts, and vice versa.

Figure 1:
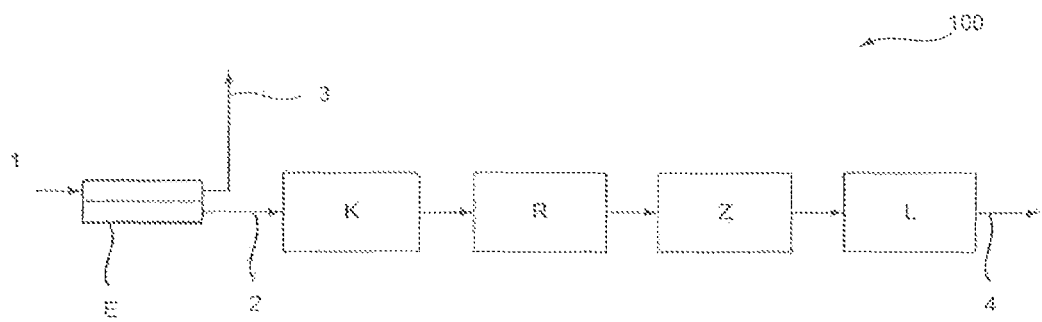
FIG. 1 is a simplified view of an advantageous development of concepts according to the invention.
Figure 2:
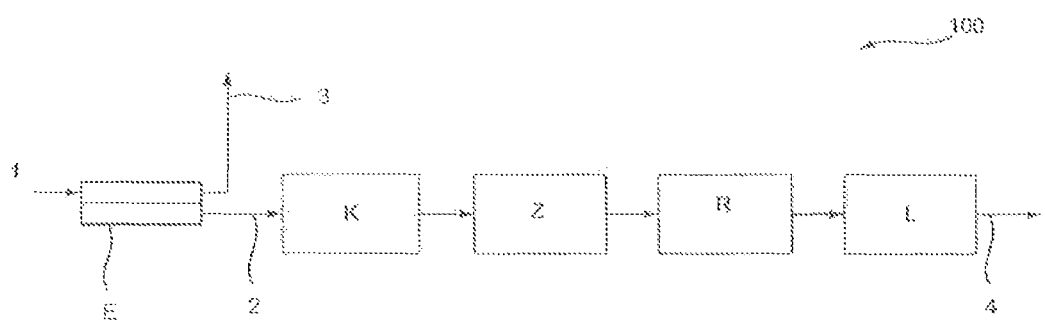
Figure 3:
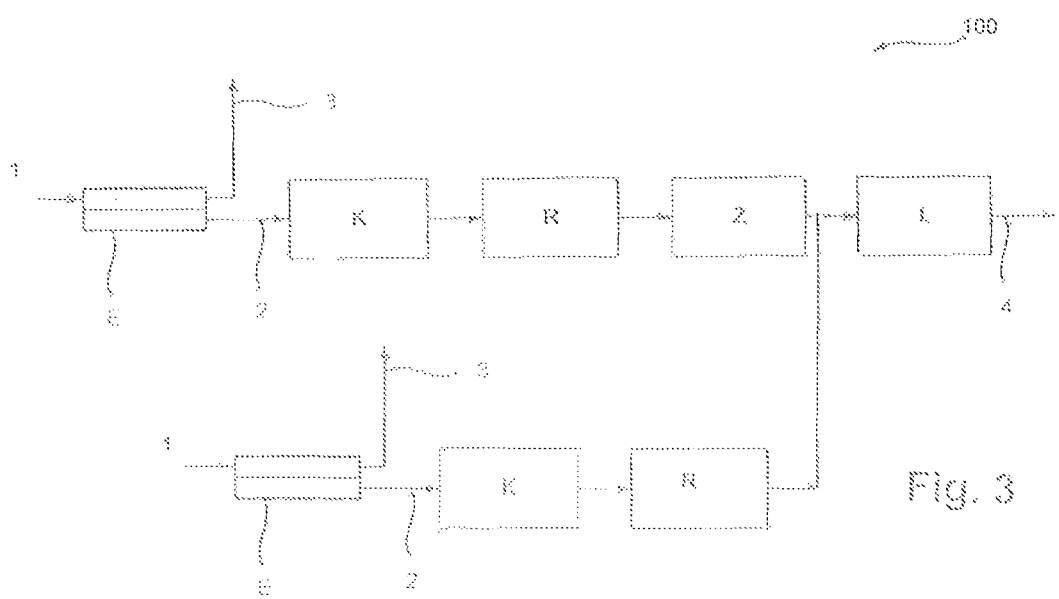

An advantageous development of the invention is shown schematically In FIG. 1 and denoted as a whole by 100.

An installation 100 comprises an electrolysis unit E, a cooling and/or compression unit K, a purification unit R, an intermediate storage Z, and a liquefaction unit L.

Such an installation 100 can also be integrated into one or more containers, such as are usually used for transportation purposes by land and sea, which can thus be transported and set up very quickly and cost-effectively.

Accordingly, the method comprises an electrolysis step E, a cooling and/or compression step K, a purification step R, an intermediate storage Z, and a liquefaction step L.

In the electrolysis E, a water-containing feed 1 is converted, using electrical energy, into a hydrogen-containing cathode raw gas 2 and an oxygen-containing anode raw gas 3. In addition to water, the feed 1 can contain additional components—in particular, electrolytes such as, for example, alkaline, acidic, or neutral salts or ions. The feed 1 can, in particular, be fed into the electrolysis unit E on the anode side.

The cathode raw gas 2 is taken from the electrolysis unit E and is fed into a post-processing stage, which, in a suitable sequence, comprises compression, purification, intermediate storage, and liquefaction. The liquefaction in each case forms the conclusion of the post-processing, and the remaining steps can be varied in their sequence.

The cooling or compression K of the cathode raw gas 2 can be carried out using a conventional mechanical chiller, or, particularly advantageously, using waste heat from the electrolysis E by means of an absorption chiller or adsorption chiller, which has a particularly advantageous effect on the total energy balance of the installation 100. Even conventional mechanical chillers can utilize waste heat from the electrolysis E, wherein these can initially be used for carrying out volume work, e.g., by steam generation in combination with a turbine for compressing the cathode raw gas 2.

Various methods are available for purification R—for example, (in particular, cryogenic) adsorption, oxidative combustion of oxygen, condensation of components with comparatively high boiling points, and so on.

Purification requirements can be significantly reduced if the feed 1 has already been stripped of impurities upstream of the electrolysis E, or depleted thereof. Particularly relevant in this context are gases, e.g., nitrogen, carbon dioxide, and/or noble gases, dissolved in the water of the feed 1. These can, for example, be expelled or otherwise removed from the feed 1 by so-called stripping, using the anode raw gas 3 produced in the electrolysis, or by other degassing strategies such as, for example, membrane degassing.

As noted above, intermediate storage Z can be implemented upstream and/or downstream of purification. The intermediate storage Z can be implemented, for example, at a constant volume using a pressure tank, wherein the pressure tank can be operated at a pressure level which corresponds to a cathode-side, electrolysis pressure level or is filled by means of a compressor with cathode raw gas 2, which can lie at a pressure level above the cathode-side pressure level. Units arranged downstream of the storage tank can in particular be designed such that they can be operated with variable input pressures, or a pressure regulator can be provided downstream of the intermediate storage Z, which ensures a constant pressure.

Within the scope of the invention, it is also possible to use storage tanks with a constant pressure as the intermediate storage Z. Such storage tanks have, for example, a variable volume (for example, in the form of a plunger or piston in a hollow cylinder or the like), or they can regulate the pressure by appropriate control of the storage temperature.

In addition, metal hydride storage tanks can be used in which a metal, e.g., an alloy containing palladium, is capable of absorbing hydrogen to form a metal hydride. If such a metal hydride storage tank is used, the release or delivery of hydrogen stored in the intermediate storage Z can, in turn, take place using waste heat from the electrolysis E, with corresponding energy advantages.

To further increase the dynamics—particularly in the region of the post-processing downstream of the electrolysis E—the respective components can also be operated in parallel to one another in a multiple embodiment, so that a larger controllable range is available. For example, several compressors and/or turbines can be provided for compression, so that the liquefaction output can be reduced to, for example, below 30% of nominal output, by completely switching off at least one component that is present several times.

As mentioned at the outset, it is advantageous to control the output of the installation 100 as a function of an external energy supply. For example, such an installation 100 can be operated with renewable electrical energy—for example, from a wind farm or a wind park. In the event of a calm, there will accordingly be little or no output available, so that electrolysis may be massively reduced in such a case. In the event that no electrical energy is available, a portion of the generated hydrogen, e.g., from the intermediate storage Z, can be used for generating electrical energy in order to continue to operate the electrolysis E at a minimum output level—for example, 10% of nominal output. Use of hydrogen which evaporates in a liquid tank downstream of the liquefaction L can also be suitable for such use. As a result, it is possible to ensure a more rapid restart or increase in electrolysis output with an increasing external energy supply, i.e., for example, with a stronger wind. In comparison to this, it takes considerably longer to run up an electrolysis unit E that has been taken out of operation—in particular, since the electrolysis unit E must be brought up to an operating temperature. In this case, such an installation 100 can in principle be integrated directly into a wind power installation (e.g., an offshore wind farm)—for example, in order to minimize power transmission losses. Liquid hydrogen and/or cold gases generated by the wind turbine can here be used in part also for cooling the wind turbine (for example, the generator), e.g., in order to minimize the power transmission losses by using superconducting materials.

To further increase the energy efficiency, a conventional heat exchanger can be used, in which the use of anode raw gas 3 and/or cathode raw gas 2 removed from electrolysis E is heated.

The anode raw gas 3 can likewise be fed into a processing facility, so that, here too, the steps of purification, drying, compression, liquefaction, and/or storage can be provided. Alternatively, the anode raw gas can be discharged to the surrounding atmosphere, since it does not in principle contain any harmful components, and is therefore harmless in terms of health and environment.

What is claimed is:

1. A method (100) for the electrolytic production of a liquid hydrogen product (4), comprising:
    subjecting a water-containing feed to electrolysis (E) while receiving an anode raw gas (3), rich in oxygen and containing hydrogen, and a cathode raw gas (2) which is depleted of oxygen and rich in hydrogen, wherein the electrolysis (E) is carried out, in parallel, at two different pressure levels, a higher pressure level and a lower pressure level, to produce a first cathode raw gas produced by the electrolysis at the higher pressure level and a second cathode raw gas produced by the electrolysis at the lower pressure level,
    wherein, downstream of the electrolysis (E), the first cathode raw gas and the second cathode raw gas are each subjected to purification (R), compression (K), and a liquefaction (L),
    wherein, downstream of the electrolysis (E) and upstream of liquefaction (L), the first cathode raw gas produced by the electrolysis at the higher pressure level is subjected at least partially to intermediate storage (Z), and
    the second cathode raw gas produced by the electrolysis at the lower pressure level is not subjected to intermediate storage (Z).

2. The method (100) according to claim 1, wherein the intermediate storage (Z) takes place at a temperature level in a range of 250 to 330 K and a pressure level in a range of 1 to 20 MPa, or at a temperature level in a range of 50 to 100 K and a pressure level of 1 to 20 MPa.

3. The method (100) according to claim 1, wherein intermediate storage (Z) is carried out upstream and/or downstream of the purification (R).

4. The method (100) according to claim 1, wherein the first cathode raw gas is subjected to compression upstream of the intermediate storage (Z).

5. The method (100) according to claim 1, wherein the purification (R) comprises at least one of catalytic conversion of oxygen to water, adsorption, a distillative separation, and a-scrubbing with an absorption fluid.

6. The method (100) according to claim 1, wherein the electrolysis (E) is operated as a function of an external energy supply, wherein at a high external energy supply, a high electrolysis output is set, and, wherein at a low supply external energy, a low electrolysis output is set.

7. The method (100) according to claim 6, wherein the electrolysis (E) has a maximum output and the electrolysis output is adapted to the external energy supply at a rate of change more than 1%/min in relation to the maximum output of the electrolysis.

8. The method (100) according to claim 1, wherein intermediate storage (Z) takes place at a temperature level in a range of 273 to 313 K and a pressure level in a range of 1 to 20 MPa, or at a temperature level in a range 75 to 100 K, and a pressure level of 1 to 20 MPa.

9. The method (100) according to claim 1, wherein intermediate storage (Z) takes place at a temperature level in a range of 273 to 313 K and a pressure level in a range of 1 to 20 MPa, or at a temperature level in a range 75 to 100 K, and a pressure level of 3 to 10 MPa.

10. The method (100) according to claim 1, wherein intermediate storage (Z) takes place at a temperature level in a range of 250 to 330 K and a pressure level in a range of 1 to 20 MPa.

11. The method (100) according to claim 1, wherein intermediate storage (Z) takes place at a temperature level in a range of 50 to 100 K and a pressure level of 1 to 20 MPa.

12. The method (100) according to claim 1, wherein intermediate storage (Z) is carried out upstream of the purification (R).

13. The method (100) according to claim 1, wherein intermediate storage (Z) is carried out downstream of the purification (R).

14. The method (100) according to claim 6, wherein the electrolysis (E) has a maximum output and the electrolysis output is adapted to the external energy supply at a rate of change of more than 0.1%/s, in relation to the maximum output of the electrolysis.

15. The method (100) according to claim 6, wherein the electrolysis (E) has a maximum output and the electrolysis output is adapted to the external energy supply at a rate of change of more than 1%/s, in relation to the maximum output of the electrolysis.

16. The method (100) according to claim 6, wherein a liquefaction output is adapted more slowly to the external energy supply than is the electrolysis output.

17. The method (100) according to claim 16, wherein the liquefaction has a maximum output and the liquefaction output is at a rate of less than 5%/min, in relation to the maximum output of the liquefaction.

18. The method (100) according to claim 16, wherein the liquefaction has a maximum output and the liquefaction output is at a rate of less than 2%/min, in relation to the maximum output of the liquefaction.

* * * * *